(12) United States Patent
Ozawa et al.

(10) Patent No.: US 7,928,601 B2
(45) Date of Patent: Apr. 19, 2011

(54) POWER SUPPLY CIRCUIT FOR PROVIDING SEMICONDUCTOR INTEGRATED CIRCUIT DEVICE WITH A PLURALITY OF POWER SUPPLY VOLTAGES

(75) Inventors: Hidekiyo Ozawa, Kasugai (JP); Hidenobu Ito, Kasugai (JP); Chikara Tsuchiya, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 605 days.

(21) Appl. No.: 11/101,483

(22) Filed: Apr. 8, 2005

(65) Prior Publication Data
US 2006/0139828 A1 Jun. 29, 2006

(30) Foreign Application Priority Data

Dec. 28, 2004 (JP) ................................. 2004-379718

(51) Int. Cl.
H02J 1/00 (2006.01)
(52) U.S. Cl. ........................................................ 307/38
(58) Field of Classification Search .................... 307/38, 307/31, 42; 323/267, 285; 327/415, 416, 327/519
See application file for complete search history.

(56) References Cited

U.S. PATENT DOCUMENTS

| 6,342,737 | B1 * | 1/2002 | Brodeur | 307/87 |
| 7,202,653 | B2 * | 4/2007 | Pai | 323/284 |
| 7,268,448 | B2 * | 9/2007 | Hasegawa | 307/31 |
| 2002/0089315 | A1 * | 7/2002 | Shi et al. | 323/267 |
| 2002/0093317 | A1 * | 7/2002 | Matsuda et al. | 323/273 |
| 2002/0126512 | A1 * | 9/2002 | Nakagawa et al. | 363/16 |
| 2004/0108842 | A1 * | 6/2004 | Oyama et al. | 323/267 |
| 2004/0113495 | A1 * | 6/2004 | Matsuo et al. | 307/29 |
| 2005/0017676 | A1 * | 1/2005 | Takimoto et al. | 320/107 |
| 2005/0030777 | A1 * | 2/2005 | Dogome et al. | 363/125 |
| 2006/0139820 | A1 * | 6/2006 | Ozawa et al. | 361/18 |
| 2006/0170405 | A1 * | 8/2006 | Hasegawa | 323/284 |
| 2006/0220631 | A1 * | 10/2006 | Ito | 323/283 |
| 2007/0069703 | A1 * | 3/2007 | Kokubun et al. | 323/282 |
| 2007/0090819 | A1 * | 4/2007 | Hasegawa et al. | 323/282 |
| 2007/0159142 | A1 * | 7/2007 | Natsume | 323/222 |
| 2007/0205662 | A1 * | 9/2007 | Nakamura et al. | 307/18 |
| 2007/0210649 | A1 * | 9/2007 | Ozawa et al. | 307/15 |
| 2007/0285077 | A1 * | 12/2007 | Hasegawa | 323/351 |

FOREIGN PATENT DOCUMENTS

JP 59-99203 U 7/1984
(Continued)

OTHER PUBLICATIONS

Taiwanese Notice of Allowance for Taiwanese Application No. 94110996, dated Jan. 16, 2008.

*Primary Examiner* — Jared J Fureman
*Assistant Examiner* — Daniel Cavallari
(74) *Attorney, Agent, or Firm* — Arent Fox, LLP

(57) ABSTRACT

A DC-DC converter for controlling the order for providing a semiconductor integrated circuit device with a plurality of power supply voltages. A switch control circuit controls activation and inactivation of a transistor of the switch circuit based on the comparison result of a first voltage and a reference voltage and a notification signal provided to the switch control circuit. The switch control circuit generates a second voltage that is higher than the first voltage when the first voltage is higher than the reference voltage and the notification signal indicates that other semiconductor integrated circuit devices are ready to operate.

2 Claims, 12 Drawing Sheets

FOREIGN PATENT DOCUMENTS

| | | |
|---|---|---|
| JP | 1-173809 U | 12/1989 |
| JP | 8-95652 A | 4/1996 |
| JP | 11-143559 A | 5/1999 |
| JP | 11-353040 A | 12/1999 |
| JP | 2003-224967 A | 8/2003 |
| JP | 2004-129333 A | 4/2004 |
| TW | 591862 B | 6/2004 |
| TW | 200412004 A | 7/2004 |
| WO | 564587 B | 12/2003 |

* cited by examiner

POWER SUPPLY CIRCUIT FOR PROVIDING SEMICONDUCTOR INTEGRATED CIRCUIT DEVICE WITH A PLURALITY OF POWER SUPPLY VOLTAGES

CROSS-REFERENCE TO RELATED APPLICATIONS

This application is based upon and claims the benefit of priority from the prior Japanese Patent Application No. 2004-379718, filed on Dec. 28, 2004, the entire contents of which are incorporated herein by reference.

BACKGROUND OF THE INVENTION

The present invention relates to a power supply circuit, and more particularly, to a power supply circuit for providing a semiconductor integrated circuit device with a plurality of power supply voltages.

In the prior art, progress has been made in increasing the speed and integration of semiconductor integrated circuit devices (LSI). Further, to meet the demand for semiconductor devices that consume less power, the voltage for semiconductor devices has decreased. Electronic devices include various types of semiconductor devices, each of which is provided with a power supply having a voltage suitable for the semiconductor device. Since the semiconductor devices are powered by the power supplies in a certain order, operation of a semiconductor device may become unstable depending on the order. Accordingly, Japanese Patent Laid-Open Publication Nos. 8-95652, 11-143559, and 2004-129333 propose a power supply circuit for controlling the order of providing semiconductor devices with a plurality of different power supply voltages.

Further, when a single semiconductor device has a plurality of circuits operating at different power supply voltages, operation of the circuits may become unstable depending on the order in which the different voltages are supplied. For example, an Application Specific Integrated Circuit (ASIC), which functions as a semiconductor device, includes an input/output circuit (I/O circuit or interface) operating at a standard voltage (voltage that is common with devices connected to the ASIC) and an internal circuit (core unit) operating at a voltage lower than the standard voltage. In this case, the I/O circuit unit must be powered after the internal circuit to prevent the generation of an erroneous signal in the I/O circuit unit. FIG. 1 is a schematic circuit diagram showing a power supply circuit 10 for controlling the supply of power. The power supply circuit 10 is, for example, a DC-DC converter (DC voltage converter circuit).

The power supply circuit 10 includes a converter circuit (DC-DC converter) 12 for supplying a semiconductor circuit 11 with a first voltage V1 generated by stepping down an input voltage Vin and a second voltage V2 substantially equal to the input voltage Vin. The semiconductor circuit 11 includes an internal circuit 11a operated by the first voltage V1 and an I/O circuit 11b operated by the second voltage V2. The converter circuit 12 includes a comparator 22, which compares the first voltage V1 and a reference voltage Vr1, and a PWM control circuit 23, which compares a comparison output signal of the comparator 22 and an oscillation output signal of an oscillator 21 to control activation and inactivation of first and second transistors T1 and T2 based on the comparison result in order to generate the first voltage V1 by stepping down the input voltage Vin. The power supply circuit 10 further includes a switch circuit 13, which is configured by a transistor TS, and a switch control circuit (SW control section) 14, which controls the switch circuit 13. The switch control circuit 14 includes a comparator 25, which compares the first voltage V1 and a reference voltage Vr2, and controls the activation and inactivation of the transistor TS based on the comparison result. Specifically, when the first voltage V1 becomes higher than the reference voltage Vr2, the comparator 25 activates the transistor TS to generate the second voltage V2 substantially equal to the input voltage Vin generated.

As shown in FIG. 2, an electronic device has a plurality of semiconductor integrated circuits 31. Each of the semiconductor integrated circuits 31 has an internal circuit and an I/O circuit. Each semiconductor device functions erroneously when the power supply voltage provided to the internal circuit fluctuates. Thus, the power supply voltage must be accurate (close to the desired value). Therefore, each semiconductor device incorporates the power supply circuit 10.

SUMMARY OF THE INVENTION

However, there are differences in the timing for providing the power supply circuit 10 of each semiconductor integrated circuit 31 with a power supply voltage. This poses a problem in that, referring to FIG. 3, a latch-up occurs in the I/O circuits 11b that communicate a signal between the semiconductor integrated circuits 31. This results in through current flowing through the I/O circuits 11b. This problem may also occur within a single semiconductor device, for example, between an internal circuit and an I/O circuit.

The present invention provides a power supply circuit for controlling the order of supplying power supplies while preventing the occurrence of through current.

One aspect of the present invention is a power supply circuit for generating a plurality of voltages, including first and second voltages, with an input voltage. The power supply circuit includes a converter circuit for converting the input voltage into the first voltage. A switch circuit outputs the input voltage as the second voltage. A switch control circuit, connected to the converter circuit and the switch circuit, compares the first voltage with a reference voltage and controls the switch circuit based on the comparison result and a notification signal indicating the condition of the first voltage.

Another aspect of the present invention is a power supply circuit for generating a plurality of voltages, including first and second voltages, with an input voltage. The power supply circuit includes a converter circuit for converting the input voltage into the first voltage. A switch circuit outputs the input voltage as the second voltage. The switch circuit has a resistance value. A switch control circuit, connected to the converter circuit and the switch circuit, controls the resistance value of the switch circuit so that the second voltage is generated in proportion to the first voltage.

A further aspect of the present invention is a power supply circuit for generating a plurality of voltages, including first and second voltages, with an input voltage. The power supply circuit includes a converter circuit for converting the input voltage into the first voltage by performing pulse width modulation based on the voltage difference between the first voltage and a lower one of a reference voltage and voltage of a soft-start signal. A switch circuit outputs the input voltage as a second voltage. The switch circuit has a resistance value. A switch control circuit, connected to the converter circuit and the switch circuit, controls the resistance value of the switch circuit so that the second voltage is generated in proportion to either one of the first voltage and the voltage of the soft-start signal voltage.

Another aspect of the present invention is a semiconductor integrated circuit device including a power supply circuit for generating first and second voltages with an input voltage. The power supply circuit includes a converter circuit for converting the input voltage into the first voltage. A switch circuit outputs the input voltage as the second voltage. A switch control circuit, connected to the converter circuit and the switch circuit, compares the first voltage with a reference voltage to control the switch circuit based on the comparison result and a notification signal indicating the condition of the first voltage. A semiconductor circuit, connected to the power supply circuit, receives the first and second voltages.

A further aspect of the present invention is a semiconductor integrated circuit device including a power supply circuit for generating first and second voltages with an input voltage. The power supply circuit includes a converter circuit for converting the input voltage to the first voltage. A switch circuit outputs the input voltage as the second voltage. The switch circuit has a resistance value. A switch control circuit, connected to the converter circuit and the switch circuit, controls the resistance value of the switch circuit so that the second voltage is generated in proportion to the first voltage. A semiconductor circuit, connected to the power supply circuit, receives the first and second voltages.

Another aspect of the present invention is a semiconductor integrated circuit device including a power supply circuit for generating first and second voltages with an input voltage. The power supply circuit includes a converter circuit for converting the input voltage to the first voltage by performing pulse width modulation based on the voltage difference between the first voltage and a lower one of a reference voltage and voltage of a soft-start. A switch circuit outputs the input voltage as the second voltage. The switch circuit has a resistance value. A switch control circuit, connected to the converter circuit and the switch circuit, controls the resistance value of the switch circuit so that the second voltage is generated in proportion to either one of the first voltage and the voltage of the soft-start signal voltage. A semiconductor circuit, connected to the power supply circuit, receives the first and second voltages.

A further aspect of the present invention is an electronic device including a plurality of power supply circuits, each generating first and second voltages with an input voltage. Each of the power supply circuits includes a converter circuit for converting the input voltage to the first voltage. A switch circuit outputs the input voltage as the second voltage. A switch control circuit, connected to the converter circuit and the switch circuit, compares the first voltage with a reference voltage to control the switch circuit based on the comparison result and a notification signal indicating the condition of the first voltage. The notification signal is provided to each of the power supply circuits.

Another aspect of the present invention is an electronic device including a plurality of power supply circuits, each generating first and second voltages with an input voltage. Each of the power supply circuits includes a converter circuit for converting the input voltage to the first voltage by performing pulse width modulation based on the difference between the first voltage and a lower one of a reference voltage and voltage of a soft-start signal. A switch circuit outputs the input voltage as the second voltage. The switch circuit has a resistance value. A switch control circuit, connected to the converter circuit and the switch circuit, controls the resistance value of the switch circuit so that the second voltage is generated in proportion to either one of the first voltage and the voltage of the soft-start signal. The soft-start signal is provided to each of the power supply circuits.

A further aspect of the present invention is an electronic device includes a plurality of semiconductor integrated circuit devices. Each of the semiconductor integrated circuit device includes a power supply circuit for generating a plurality of voltages including first and second voltages with an input voltage. The power supply circuit includes a converter circuit for converting the input voltage into the first voltage. A switch circuit outputs the input voltage as the second voltage. A switch control circuit, connected to the converter circuit and the switch circuit, compares the first voltage with a reference voltage and controls the switch circuit based of the comparison result and a notification signal indicating the condition of the first voltage. A semiconductor circuit, connected to the power supply circuit, receives the first and second voltages. The notification signal is provided to the power supply circuit of each of the semiconductor integrated circuit devices.

Another aspect of the present invention is an electronic device including a plurality of semiconductor integrated circuit devices. Each of the semiconductor integrated circuit device includes a power supply circuit for generating a plurality of voltages, including first and second voltages, with an input voltage. The power supply circuit includes a converter circuit for converting the input voltage to the first voltage by performing pulse width modulation based on the voltage difference between the first voltage and a lower one of a reference voltage and voltage of a soft-start signal. A switch circuit outputs the input voltage as the second voltage. The switch circuit has a resistance value. A switch control circuit, connected to the converter circuit and the switch circuit, controls the resistance value of the switch circuit so that the second voltage is generated in proportion to either one of the first voltage and the voltage of the soft-start signal voltage. A semiconductor circuit is connected to the power supply circuit for receiving the first and second voltages. The soft-start signal is provided to the power supply circuit of each of the semiconductor integrated circuit devices.

A further aspect of the present invention is a method for controlling a power supply circuit including a converter circuit, for converting an input voltage into a first voltage, and a switch circuit, for outputting the input voltage as a second voltage. The method including comparing the first voltage with a reference voltage, providing a notification signal indicating the condition of the first voltage, and controlling the switch circuit based on the comparison result and the notification signal indicating the condition of the first voltage.

Another aspect of the present invention is a method for controlling a power supply circuit including a converter circuit, for converting an input voltage into a first voltage, and a switch circuit, for outputting the input voltage as a second voltage. The switch circuit has a resistance value. The method includes detecting the first voltage, and controlling the resistance value of the switch circuit so that the second voltage is generated in proportion to the first voltage.

A further aspect of the present invention is a method for controlling a power supply circuit including a converter circuit, for converting an input voltage to a first voltage by performing pulse width modulation based on the voltage difference between the first voltage and the lower one of a reference voltage and voltage of a soft-start signal voltage, and a switch circuit, for outputting the input voltage as a second voltage. The switch circuit has a resistance value. The method includes detecting either one of the first voltage and the soft-start signal voltage, and controlling the resistance value of the switch circuit so that the second voltage is generated in proportion to either one of the first voltage and the soft-start signal voltage.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
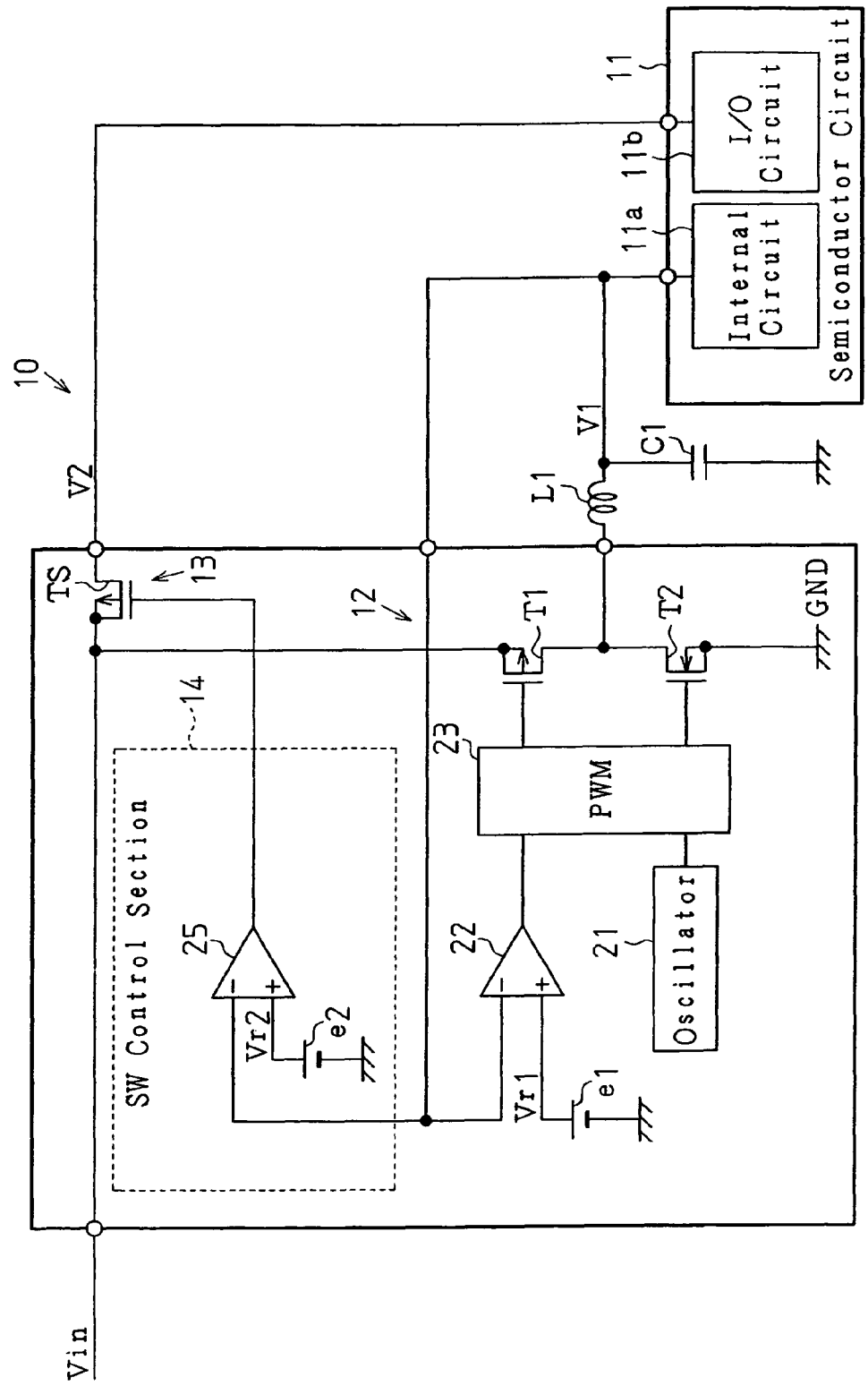
FIG. 1 is a schematic circuit diagram showing a prior art semiconductor integrated circuit device.
Figure 2:
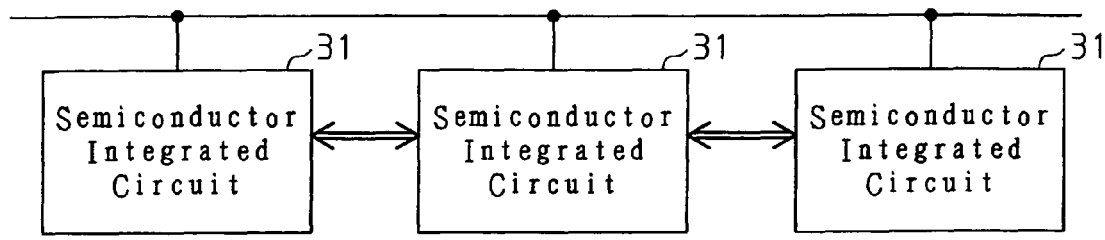
FIG. 2 is a schematic block diagram showing a prior art electronic device.
Figure 3:
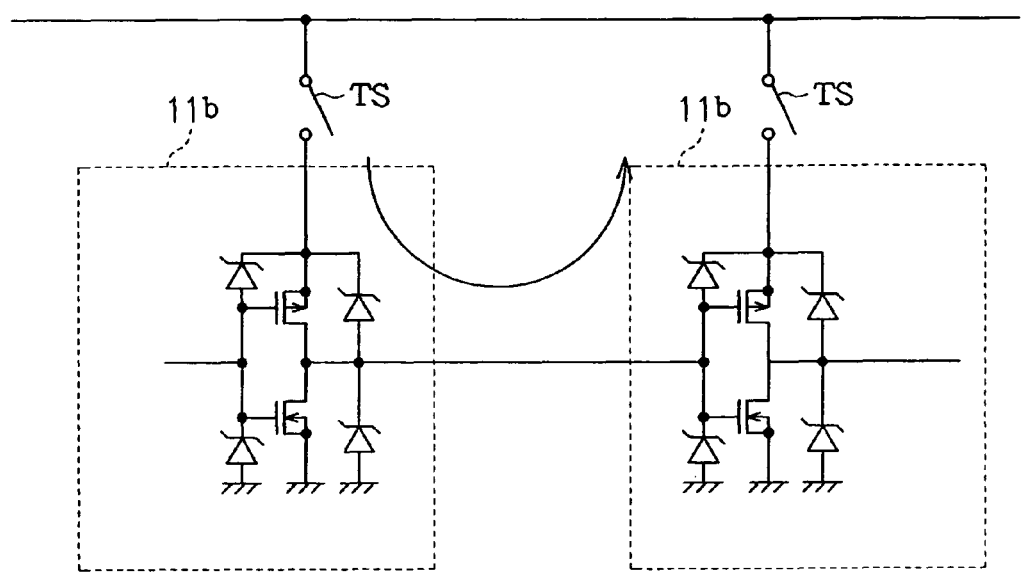
FIG. 3 is a schematic circuit diagram showing the connection relationship between I/O circuits of semiconductor integrated circuit devices.

In the drawings, like numerals are used for like elements throughout.

A semiconductor integrated circuit device (hereafter simply referred to as a "semiconductor device") 40 according to a first embodiment of the present invention will now be described with reference to FIGS. 4 to 6.

The semiconductor device 40 includes a semiconductor circuit 41 and a power supply circuit 42 (DC-DC converter) for providing the semiconductor circuit 41 with a plurality of power supply voltages. The circuits 41 and 42 are configured on a single semiconductor integrated circuit substrate. The semiconductor circuit 41 includes a plurality of circuits operating at different power supply voltages. In the present embodiment, the plurality of circuits include an internal circuit 41a (Core Logic) and an I/O circuit 41b (Interface Logic). The internal circuit 41a operates at a first voltage and the I/O circuit 41b operates at a second voltage.

The power supply circuit 42 generates a plurality of power supply voltages required for the semiconductor circuit 41 based on an input voltage Vin. The power supply circuit 42 in the present embodiment is a DC-DC converter generating a first voltage V1, which functions as a first DC voltage and which is generated by stepping down the input voltage Vin, and a second voltage V2, which functions as a second DC voltage substantially equal to the input voltage Vin.

The power supply circuit 42 includes a converter circuit 43, a switch circuit 44, and a switch control circuit (SW control section) 45.

The converter circuit 43 converts the input voltage Vin, which is a DC voltage, into the first voltage V1, which is a DC voltage. The switch circuit 44 is connected between the input voltage Vin and the semiconductor circuit 41. The switch control circuit 45 receives the first voltage V1 and a notification signal ST to control the activation and inactivation of the switch circuit 44 based on the first voltage V1 and the notification signal ST. When the switch circuit 44 is activated (closed), the input voltage Vin is supplied to the semiconductor circuit 41 as the second voltage V2.

The converter circuit 43 includes an error amplification circuit 51, a reference power supply e1 for supplying a reference voltage Vr1, an oscillator 52, a PWM control circuit 53, a first transistor T1, and a second transistor T2. The converter circuit 43 generates a pulse width modulated signal according to the difference between the first voltage V1 and the reference voltage Vr1 and controls the first and second transistor T1 and T2 according to the pulse width modulated signal to generate the first voltage V1.

The error amplification circuit 51 has a non-inverting input terminal connected to the reference voltage Vr1 and an inverting input terminal connected to the first voltage V1. The error amplification circuit 51 amplifies the difference between the reference voltage Vr1 and the first voltage V1 to generate an amplified signal S1. The oscillator 52 is a triangular wave oscillator, which generates a triangular wave signal OSC1 having a predetermined frequency. The PWM control circuit 53 compares the voltage of the amplified signal S1 of the error amplification circuit 51 with the voltage of the triangular wave signal OSC1 to generate a first control signal SG1 and a second control signal SG2 having a pulse width corresponding to the comparison result.

The first transistor T1 is preferably a p-channel MOS transistor with a source connected to the input voltage Vin, a drain connected to the second transistor T2, and a gate responsive to the first control signal SG1. The second transistor T2 is preferably an n-channel MOS transistor with a source connected to a low potential power supply (ground GND in the present embodiment), a drain connected to the first transistor T1, and a gate responsive to the second control signal SG2. A node between the first and second transistors T1 and T2 is connected to the semiconductor circuit 41 via a choke coil L1. A node between the coil L1 and the semiconductor circuit 41 is connected to the ground GND via a smoothing capacitor C1.

The first and second transistors T1 and T2 are activated and inactivated by the first and second control signal SG1 and SG2 in a substantially complementary manner. The first voltage V1 generated by stepping down the input voltage Vin is supplied to the semiconductor circuit 41 by the activation and inactivation of the transistors T1 and T2. The first voltage V1 is determined by the ON/OFF ratio of the transistors T1 and T2 according to the comparison of the amplified signal S1 and the triangular wave signal OSC1. That is, the converter circuit 43 feeds back the first voltage V1 to control the pulse width of the first control signal SG1 and second control signal SG2 (PWM control). This controls the ratio between activation time and inactivation time of the transistor T1 (on/off ratio) to control the first voltage V1.

The switch circuit 44 is preferably a p-channel MOS transistor TS, which has a first terminal (e.g., source terminal) for receiving the input voltage Vin, a second terminal (e.g., drain terminal) connected to the semiconductor circuit 41, and a control terminal (gate terminal) connected to the switch control circuit 45.

The switch control circuit 45 includes reference power supplies e11 and e12, comparators 61 and 62, and a transistor T11. The first comparator 61 is a voltage comparator having an inverting input terminal receiving the first voltage V1, a non-inverting input terminal receiving a first reference voltage Vr11 of the first reference power supply e11, and an output terminal connected to the gate of the transistor T11. The first reference voltage Vr11 of the first reference power supply e11 is set lower than the specified first voltage V1. The first comparator 61 compares the first voltage V1 and the first reference voltage Vr11 to generate a comparison signal S11 having a high level or low level in accordance with the comparison result.

The transistor T11 in the present embodiment is an n-channel MOS transistor with a source connected to a low potential power supply (ground GND), a drain connected to an external terminal P1, and a gate responsive to a comparison signal S11. The switch control circuit 45 outputs from the external terminal P1 the notification signal ST, which corresponds to the condition of the transistor T11. The condition (ON or OFF) of the transistor T11 is determined by the comparison result of the first comparator 61 (i.e., the relationship between the first voltage V1 and the first reference voltage Vr11, or whether or not the first voltage V1 is greater than the first reference voltage Vr11). Accordingly, the first reference voltage Vr11 is appropriately set to generate the notification signal ST, which indicates whether the first voltage V1 has substantially reached a predetermined voltage.

It can be assumed that the notification signal ST is provided to the switch control circuit 45 via the external terminal P1 during activation and inactivation of the transistor T1. The drain of the transistor T11 is connected to the inverting input terminal of the second comparator 62. Therefore, the notification signal ST is provided to the inverting input terminal of the second comparator 62. In other words, a voltage corresponding to the activation or inactivation condition of the transistor T11 and the voltage of the notification signal ST is applied to the inverting input terminal of the second comparator 62. Specifically, the inverting input terminal of the second comparator 62 is set to the ground GND level when the transistor T11 is activated and set to the voltage level of the notification signal ST when the transistor T11 is inactivated.

The second comparator 62 has a non-inverting input terminal for receiving a second reference voltage Vr12 of the second reference power supply e12. The second reference voltage Vr12 of the second reference power supply e12 is set lower than the input voltage Vin. The second comparator 62 compares the voltage level at the inverting input terminal with the second reference voltage Vr12 and generates a comparison signal S12 having a high level or low level according to the comparison result. The comparison signal S12 is applied to the gate of the transistor TS, which functions as the switch circuit 44.

The external terminal P1 is connected to the input voltage Vin via a resistor R1. Therefore, the voltage at the external terminal P1 is pulled up by the resistor R1 to the input voltage Vin level.

In the switch control circuit 45, the first comparator 61 generates the comparison signal S11 at a high level when the first voltage V1 is lower than the first reference voltage Vr11 to activate the transistor T11 with the comparison signal S11. Thus, the voltage level at the inverting input terminal of the second comparator 62 becomes lower than the second reference voltage Vr12. The second comparator 62 thus generates the comparison signal S12 at a high level and the switch circuit 44 is inactivated (opened) by the comparison signal S12.

When the first voltage V1 is higher than the first reference voltage Vr11, the first comparator 61 generates the comparison signal S11 at a low level, and the transistor T11 is inactivated by the comparison signal S11. Thus, the second comparator 62 receives the notification signal ST, generates the comparison signal S12 in accordance with the comparison result of the voltage level of the notification signal ST and the second reference voltage Vr12, and activates (closes) or inactivates (opens) the switch circuit 44 with the comparison signal S12.

In this manner, the switch control circuit 45 inactivates the switch circuit 44 when the first voltage V1 is lower than the first reference voltage Vr11. When the first voltage V1 is higher than the first reference voltage Vr11, the switch control circuit 45 activates or inactivates the switch circuit 44 according to the voltage level of the notification signal ST (voltage level at the external terminal P1).

Figure 4:
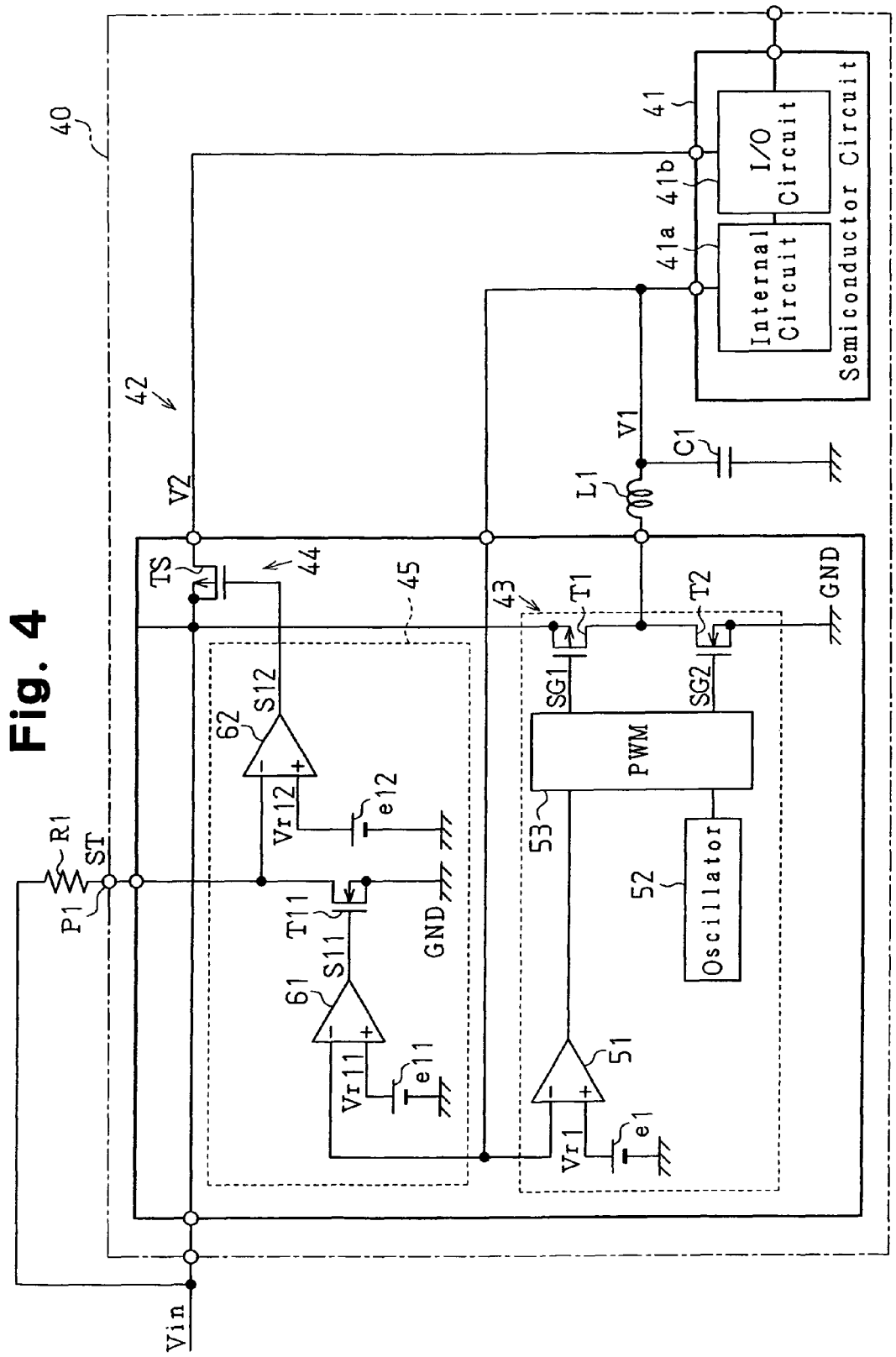
FIG. 4 is a schematic circuit diagram showing a semiconductor integrated circuit device according to a first embodiment of the present invention.
Figure 5:
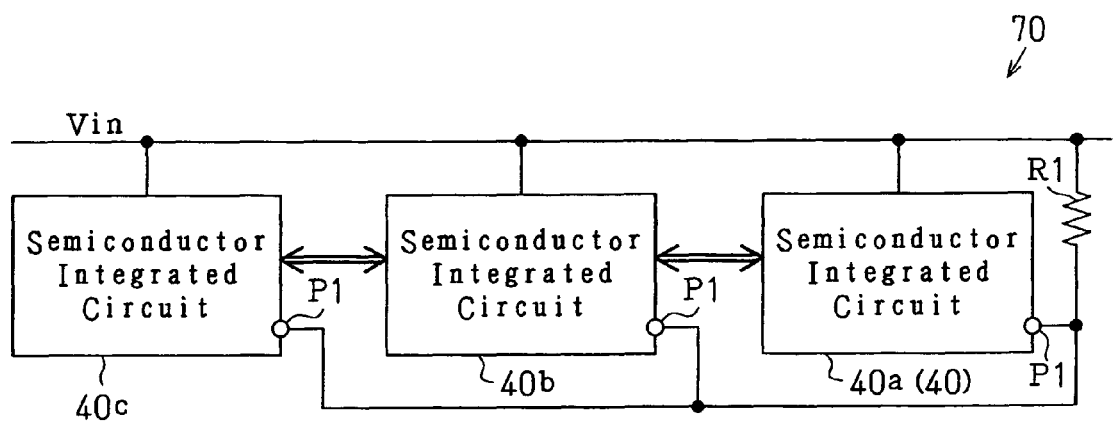
FIG. 5 is a schematic block diagram showing an electronic device including a plurality of the semiconductor integrated circuit devices shown in FIG. 4.
Figure 6:
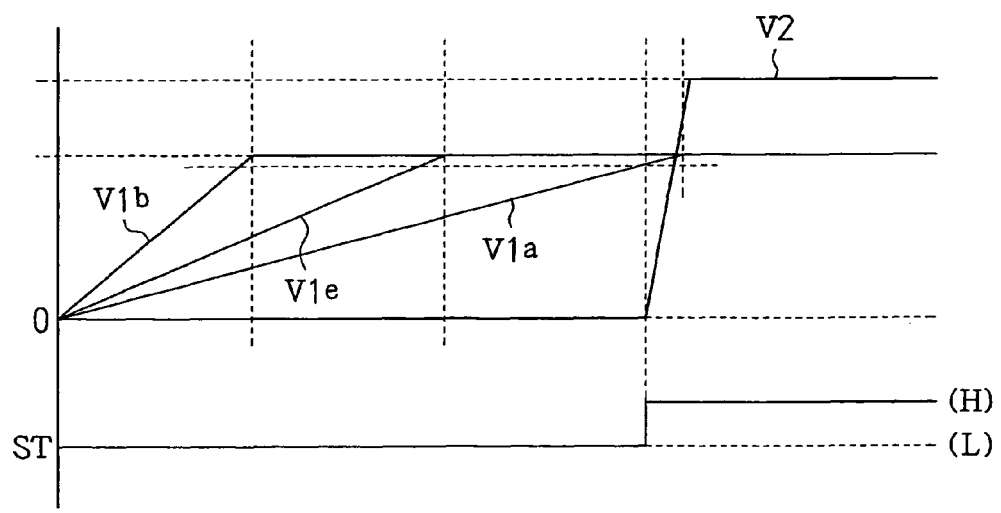
FIG. 6 is a waveform chart showing the operation of a DC-DC converter for the plurality of semiconductor integrated circuit devices shown in FIG. 5.

As shown in FIG. 5, electronic device 70 includes the semiconductor device 40 shown in FIG. 4 (referred to as semiconductor device 40a for distinguishing from other semiconductor devices) and a plurality of (two in this case) semiconductor devices 40b and 40c. In the same manner as the semiconductor device 40a, each of the semiconductor devices 40b and 40c also includes a plurality of semiconductor circuits (not shown) respectively operating at a first voltage V1b and the second voltage V2. The semiconductor circuits in the semiconductor devices 40a, 40b, and 40c are connected via I/O circuits so that signals can be exchanged between one another.

The semiconductor devices 40b and 40c each include a power supply circuit (not shown) similar to the power supply circuit 42 of the semiconductor device 40a. The external terminals P1 of the power supply circuits are connected to one another. Therefore, the resistor R1 pulls up the external terminals P1 of the semiconductor devices 40a, 40b, and 40c to the input voltage Vin level.

The timing for outputting the second voltage V2 differs between the semiconductor device 40a, 40b, and 40c. The difference is due to the speed at which first voltage V1 rises. For example, the first voltages V1 of the semiconductor devices 40a, 40b, and 40c are denoted by V1a, V1b, and V1c, respectively. The second voltages V2 are denoted by V2a, V2b, and V2c, respectively. Further, it is assumed that, as shown in FIG. 6, the rising speed of the first voltage V1b in the semiconductor device 40b is the highest, and the rising speed of the first voltage V1a in the semiconductor device 40a is the lowest.

In the above case, the power supply circuit 42 in each of the semiconductor devices 40a, 40b, and 40c activates the transistor T11 when the corresponding first voltage V1a, V1b, or V1c is lower than the reference voltage Vr11 to set the external terminal P1 to the ground GND level. This means that, in each of the semiconductor devices 40a, 40b, and 40c, the power supply circuit 42 outputs the notification signal ST at a low level from the external terminal P1 when the corresponding first voltage V1a, V1b, or V1c is lower than the reference voltage Vr11. In other words, if the first voltage is lower than the reference voltage Vr11 in at least one of the plurality of semiconductor devices 40a, 40b, and 40c, the notification signal ST is generated at a low level. Therefore, as shown in FIG. 6, when the first voltage V1a of the semiconductor device 40a having the lowest voltage rising speed becomes higher than the reference voltage Vr11, the notification signal ST becomes high.

The power supply circuit 42 in each of the semiconductor device 40a, 40b, and 40c activates the switch circuit 44 in response to a high notification signal ST. Therefore, the timings at which the semiconductor devices 40a, 40b, and 40c generate the second voltage V2 are substantially synchronized. Accordingly, the timings at which the second voltage V2 is provided to the I/O circuits 41b of the semiconductor devices 40a, 40b, and 40c are also substantially synchronized. Thus, a latch-up does not occur in any of the I/O circuits 41b.

The semiconductor device 40 of the first embodiment has the advantages described below.

(1) The switch control circuit 45 controls the activation and inactivation of the transistor TS in the switch circuit 44 based on the provided notification signal ST and the comparison result of the first voltage V1 and the reference voltage Vr11. If the first voltage V1 is higher than the reference voltage Vr11 and the notification signal ST indicates that the other devices are ready to operate, then a second voltage V2 is generated. Accordingly, the order for supplying the plurality of voltages V1 and V2 is controlled. Further, through current is prevented from flowing between the internal circuit 41a, which is supplied with the first voltage V1, and the I/O circuit 41b, which is supplied with the second voltage V2.

(2) The switch control circuit 45 generates a signal corresponding to the comparison result of the first voltage V1 and the reference voltage Vr11. Therefore, by connecting the plurality of power supply circuits 42 to one another so that the power supply circuits 42 each receive the notification signal ST, the second voltage V2 is generated when the first voltage V1 of each power supply circuit 42 becomes higher than the reference voltage Vr11 and the notification signal ST indicates that the other devices are ready to operate. Accordingly, the order of providing the voltages V1 and V2 may be controlled in a plurality of semiconductor devices. Further, through current is prevented from flowing between the I/O circuits 41b supplied with the second voltage V2.

Figure 7:
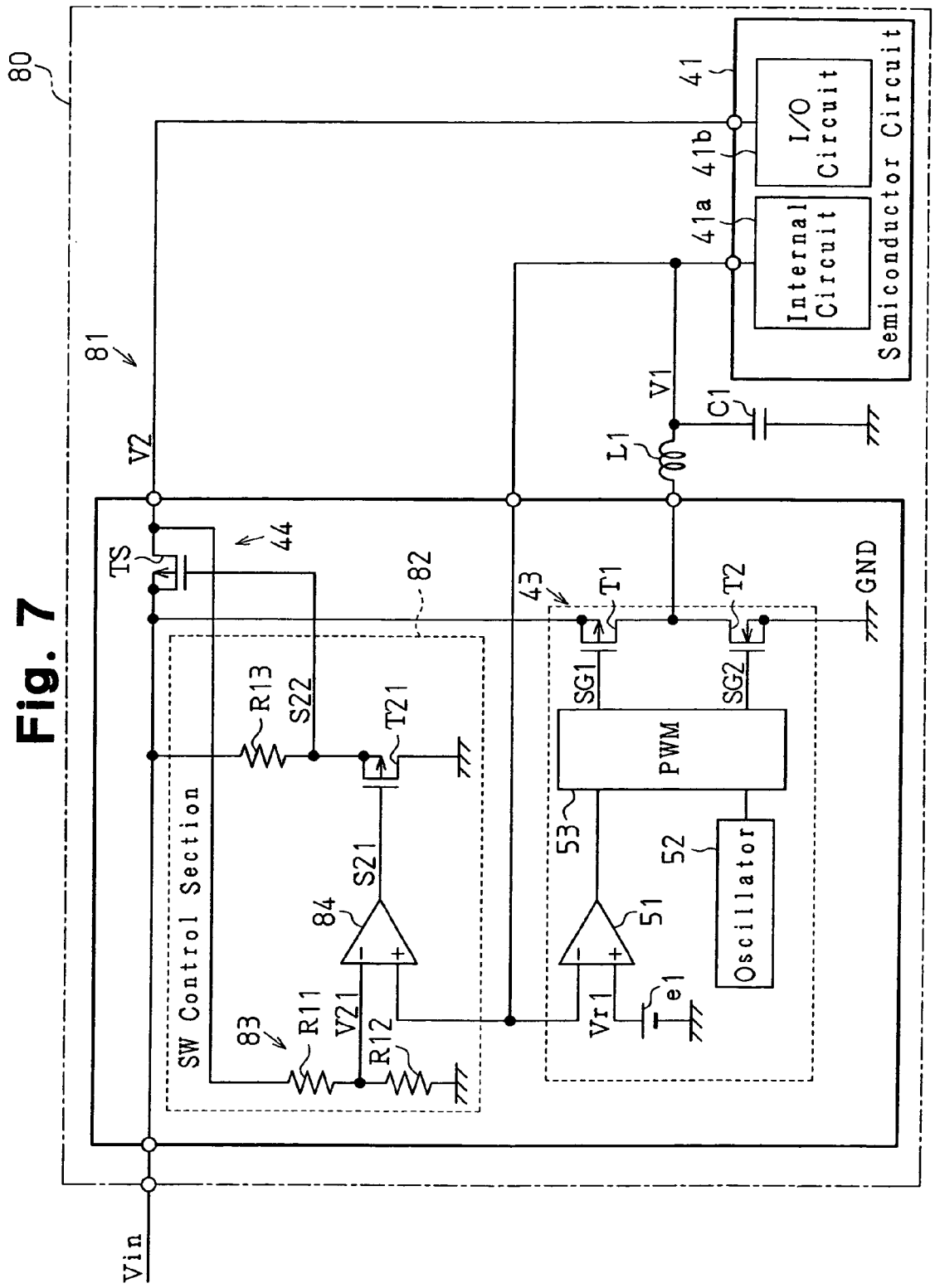
FIG. 7 is a schematic circuit diagram showing a semiconductor integrated circuit device according to a second embodiment of the present invention.
Figure 8:
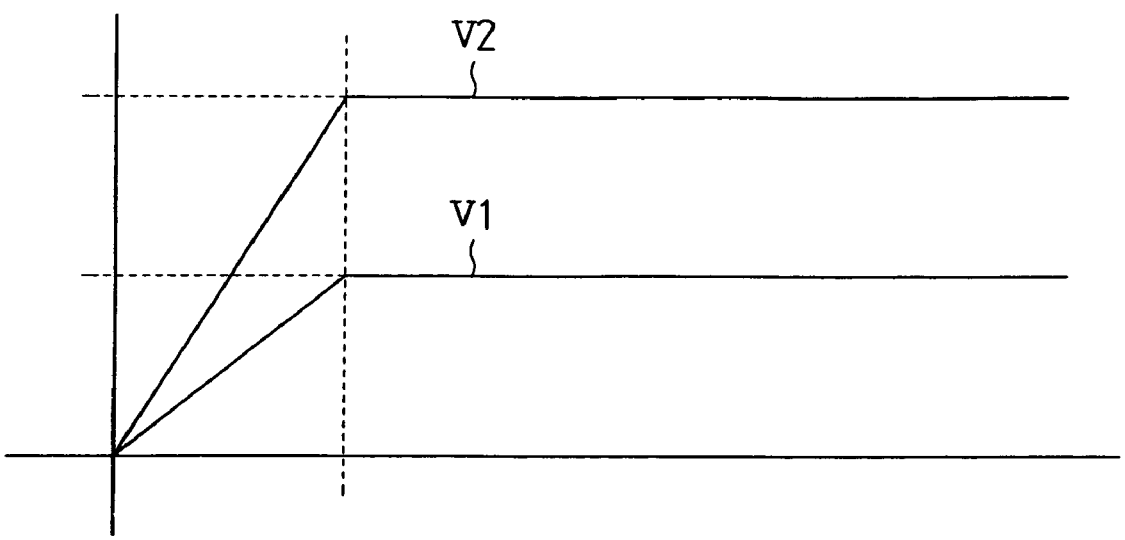
FIG. 8 is a waveform chart showing the operation of a DC-DC converter for the semiconductor integrated circuit device in FIG. 7.

A semiconductor integrated circuit device (semiconductor device) 80 according to a second embodiment of the present invention will now be described with reference to FIGS. 7 and 8. The semiconductor device 80 includes a semiconductor circuit 41 and a power supply circuit 81 (DC-DC converter), which powers the semiconductor circuit 41 with a plurality of power supplies. These circuits 41 and 81 are configured on a single semiconductor substrate.

The power supply circuit 81 includes a converter circuit 43, a switch circuit 44, and a switch control circuit (SW control section) 82. The switch control circuit 82 includes a voltage dividing circuit 83, an error amplifier 84, a transistor T21, and a resistor R13.

The voltage dividing circuit 83 includes a plurality of (two in the present embodiment) series-connected resistors R1 and R12. The first resistor R11 has a first terminal connected to the output terminal of the switch circuit 44 (the second terminal of the transistor TS) and a second terminal connected to a first terminal of the second resistor R12. A second terminal of the second resistor R12 is connected to the ground GND. A node between the first resistor R11 and the second resistor R12 is connected to an inverting input terminal of the error amplifier 84. The voltage dividing circuit 83 divides a second voltage V2 according to the ratio of the resistance values of the first resistor R11 and the second resistor R12 to generate a divided voltage V21.

The error amplifier 84 has an inverting input terminal for receiving the divided voltage of the voltage dividing circuit 83, a non-inverting input terminal for receiving the first voltage V1, and an output terminal connected to the transistor T21. The error amplifier 84 amplifies the difference between the first voltage V1 and the divided voltage V21 to generate an amplified signal S21.

The transistor T21 is preferably a p-channel MOS transistor with a source connected to a first terminal of the resistor R13, a drain connected to a low potential power supply (ground GND), and a gate responsive to the amplified signal S21. A second terminal of the resistor R13 receives the input voltage Vin. A node between the transistor T21 and the resistor R13 is connected to the gate of the transistor TS.

In the power supply circuit 81 described above, if the divided voltage V21 is lower than the first voltage V1, the on-resistance value of the transistor T21 is decreased by the amplified signal S21 of the error amplifier 84. This decreases the voltage of a signal S22 applied to the gate of the transistor TS and the on-resistance value of the transistor TS. Accordingly, the second voltage V2 rises as the on-resistance value of the transistor TS decreases.

As the second voltage V2 rises, the divided voltage V21 also rises to approach the first voltage V1. When the difference between the first voltage V1 and the divided voltage V21 becomes close to zero, the voltage of the amplified signal S21 generated by the error amplifier 84 decreases and the on-resistance value of the transistor T21 increases. Therefore, the voltage of the signal S22 applied to the gate of the transistor TS increases and the on-resistance value of the transistor TS increases. Accordingly, the second voltage V2 is lowered.

The operation of the converter circuit 43 gradually increases the first voltage V1 after the power is turned on. As a result, the voltage at the non-inverting input terminal of the error amplifier 84 increases, and the second voltage V2 increases accordingly. Specifically, as shown in FIG. 8, the power supply circuit 81 operates as a linear regulator for increasing the second voltage V2 in proportion to the increase of the first voltage V1. If the first voltage V1 is maintained at a fixed voltage, the switch control circuit 82 maintains the second voltage V2 output by the switch circuit 44 at a fixed voltage in accordance with the voltage supplied to the non-inverting input terminal of the error amplifier 84.

The power supply circuit 81 prevents the occurrence of through current in the internal circuit 41a of the semiconductor circuit 41. Specifically, the power supply circuit 81 increases the second voltage V2 supplied to the I/O circuit 41b in proportion to the increase of the first voltage V1 supplied to the internal circuit 41a. As a result, the voltage of the signals provided to the input gate of the internal circuit from the I/O circuit 41b is stabilized and the occurrence of through current is prevented. The internal circuit 41a and the I/O circuit 41b are powered by different power supplies. Thus, if the internal circuit 41a was to be supplied with the first voltage V1 when the I/O circuit 41b is not supplied with the second voltage V2, the voltage of the signals provided to the input gate of the internal circuit 41a from the I/O circuit 41b would become unstable and through current may occur.

The semiconductor device 80 of the second embodiment has the advantages described below. The power supply circuit 81 increases the second voltage V2 supplied to the I/O circuit 41b in proportion to the increase of the first voltage V1 provided to the internal circuit 41a. Therefore, the voltage of the signals provided to the input gate of the internal circuit from the I/O circuit 41b is stabilized and the occurrence of through current can be prevented.

A semiconductor integrated circuit device (semiconductor device) 90 according to a third embodiment of the present invention will now be described with reference to FIGS. 9 to 11. The semiconductor device 90 includes a semiconductor circuit 41 and a power supply circuit 91 (DC-DC converter) for providing the semiconductor circuit 41 with a plurality of power supply voltages. The circuits 41 and 91 are configured on a single semiconductor substrate.

The power supply circuit 91 includes a converter circuit 92, a switch circuit 44, and a switch control circuit (SW control section) 82.

The converter circuit 92 includes an error amplifier 93, a reference power supply e1, a PWM control circuit 53, an oscillator 52, a first transistor T1, and a second transistor T2. The converter circuit 92 is provided with a soft-start signal SS. The converter circuit 92 generates a pulse width modulated signal based on the difference between the first voltage V1 and the lower one of the soft-start signal SS and reference voltage Vr1 of the reference power supply e1. Then, the converter circuit 92 controls the first and second transistors T1 and T2 with the pulse width modulated signal to generate the first voltage V1.

The error amplifier 93 has a first non-inverting input terminal for receiving the reference voltage Vr1, a second non-inverting input terminal connected to an external terminal P2 for providing the soft-start signal SS, and an inverting input terminal for receiving the first voltage V1. A capacitor C2 is connected between the external terminal P2 and the ground GND. The external terminal P2 is connected to a constant current circuit 94. The second non-inverting input terminal of the error amplifier 93 is provided with the soft-start signal SS having the voltage between the two terminals of the capacitor C2, which is increased as the capacitor C2 is charged by the constant current circuit 94. The error amplifier 93 amplifies the difference between the first voltage V1 and the lower one of the reference voltage Vr1 and the soft-start signal SS to generate an amplified signal S31.

In the converter circuit 92, the capacitor C2 connected to the external terminal P2 is in a discharged state when the power is turned on (when the power supply circuit 91 is activated). Thus, the soft-start signal SS has a voltage of zero volts (0 V). Therefore, the converter circuit 92 generates the first voltage V1 at 0 V. The voltage of the soft-start signal SS is increased gradually from 0 V as the capacitor C2 is charged by current I1 supplied from the constant current circuit 94. During the period the voltage of the soft-start signal SS is lower than the reference voltage Vr1, the converter circuit 92 controls the transistors T1 and T2 in accordance with the difference between the voltage of the soft-start signal SS and the first voltage V1. Therefore, as the voltage of the soft-start signal SS rises gradually, the converter circuit 92 increases the first voltage V1 gradually according to the voltage of the soft-start signal SS. When the voltage of the soft-start signal SS exceeds the reference voltage Vr1, the converter circuit 92 controls the transistor T1 and T2 in accordance with the difference between the reference voltage Vr11 and the first voltage V1. Accordingly, the converter circuit 92 operates to control the first voltage V1 with the reference voltage Vr1 and to maintain the first voltage V1 at a fixed voltage.

Figure 9:
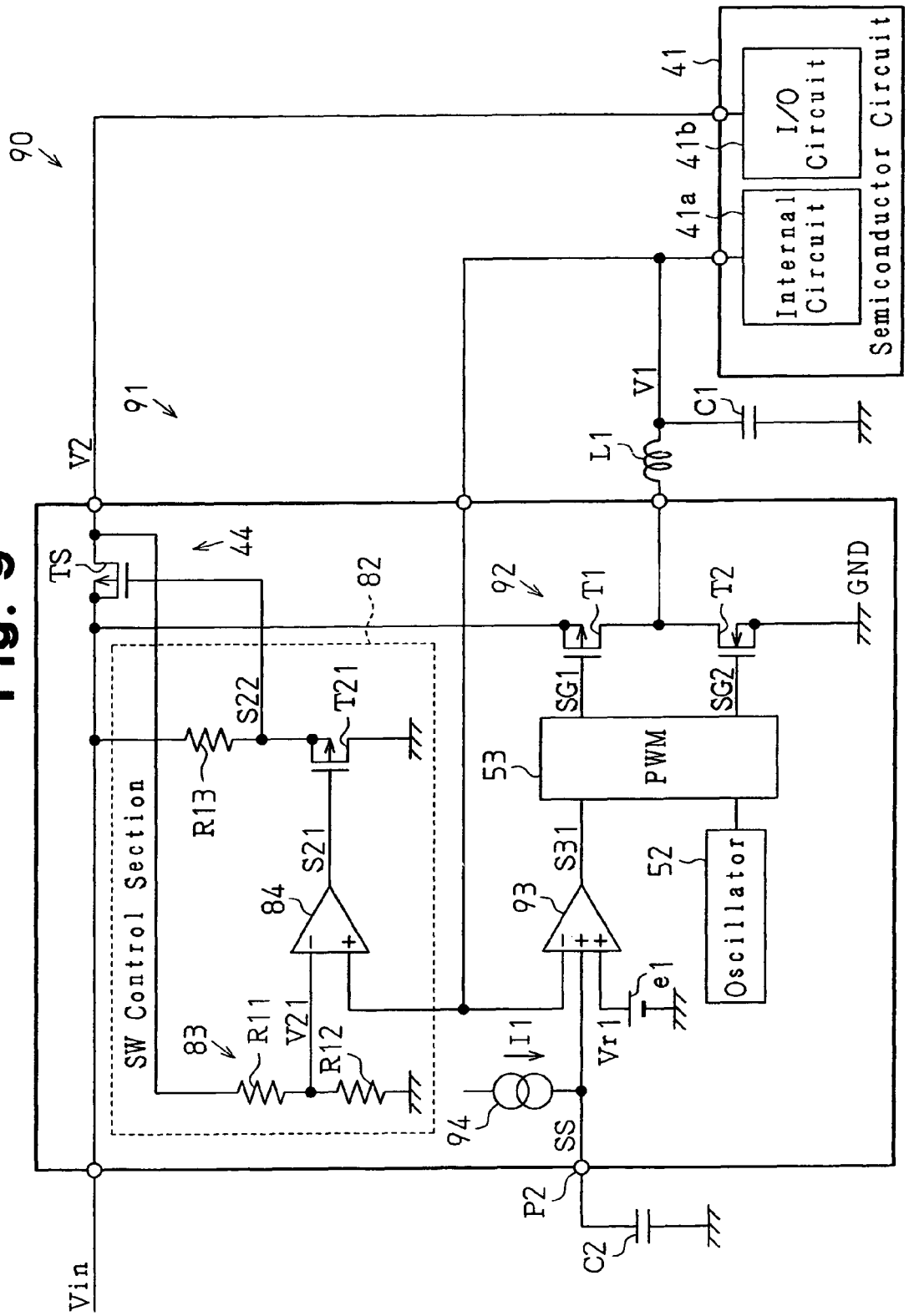
FIG. 9 is a schematic circuit diagram showing a semiconductor integrated circuit device according to a third embodiment of the present invention.
Figure 10:
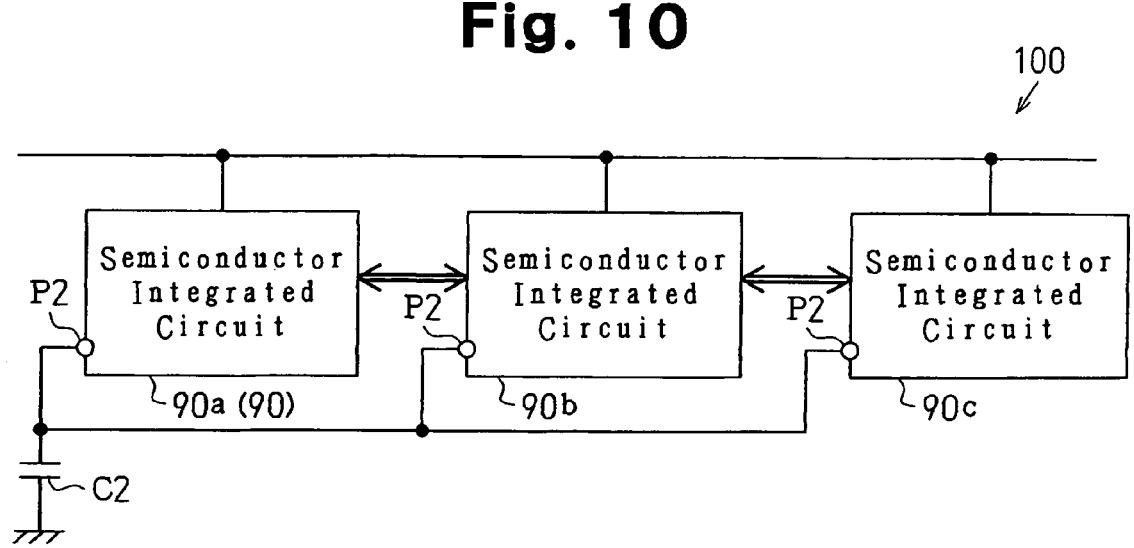
FIG. 10 is a schematic block diagram showing an electronic device including a plurality of the semiconductor integrated circuit devices shown in FIG. 9.
Figure 11:
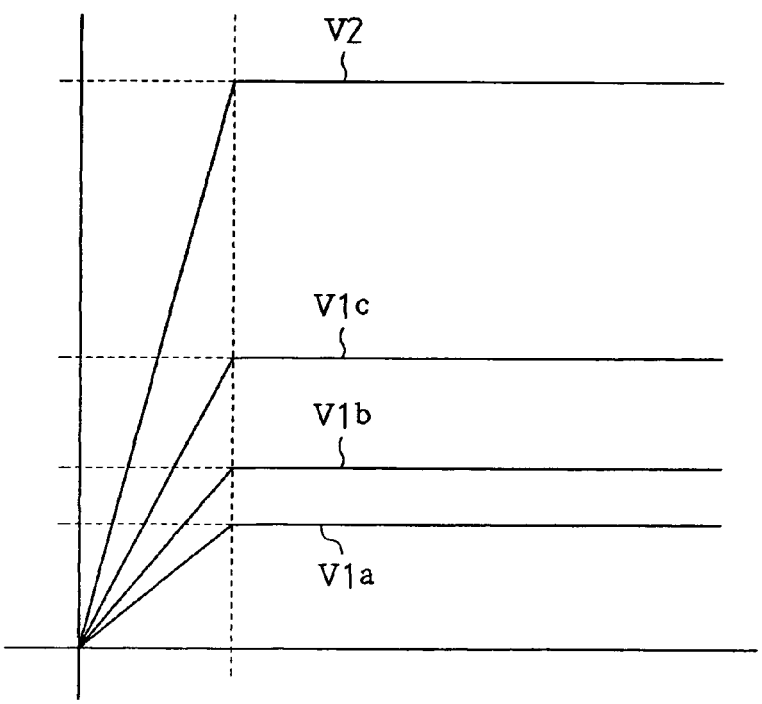
FIG. 11 is a waveform chart illustrating the operation of DC-DC converters for the plurality of semiconductor integrated circuit devices shown in FIG. 10.

As shown in FIG. 10, an electronic device 100 includes the semiconductor device 90 shown in FIG. 9 (referred to as the semiconductor device 90a for distinguishing from other semiconductor devices) and a plurality of (two in this embodiment) semiconductor devices 90b and 90c. The semiconductor device 90b includes, like the semiconductor device 90a, a plurality of semiconductor circuits (not shown) respectively operating at a first voltage V1b and a second voltage V2. The semiconductor device 90c also includes, like the semiconductor device 90a, a plurality of semiconductor circuits (not shown) respectively operating at a first voltage V1b and a second voltage V2. In the third embodiment, the first voltages required by the internal circuits 41a of the semiconductor devices 90a, 90b, and 90c have different values and are respectively represented by V1a, V1b, and V1c. The semiconductor circuits 41 of the semiconductor devices 90a, 90b, and 90c are connected to each other by the I/O circuits 41b so as to exchange signals with one another. Each of the semiconductor devices 90b and 90c includes a power supply circuit (not shown) similar to the power supply circuit 91 of the semiconductor device 90a, and the external terminals P2 of the power supply circuits are connected to one another. Accordingly, the semiconductor devices 90a, 90b, and 90c are each provided with a soft-start signal SS having a voltage corresponding to the charged state of the capacitor C2, which is connected to the external terminal P2. Thus, as shown in FIG. 11, the power supply circuits 91 of the semiconductor devices 90a, 90b, and 90c increase the second voltage V2 at the same time as the first voltages V1, V1b, and V1c and increase the second voltage V2 in proportion to the increase of the first voltages V1, V1b, and V1c.

The power supply circuit 91 increases the second voltage V2 supplied to the internal circuit 41a in proportion to the increase of the first voltage V1 supplied to the I/O circuit 41b. Therefore, the voltage of signals provided to the input gate of the internal circuit 41a from the I/O circuit 41b is stabilized, and the occurrence of through current is prevented. The power supply circuit 91 in each of the semiconductor devices 90a, 90b, and 90c increases the first voltage V1 (V1a, V1b, and V1c) according to the soft-start signal SS, which has a voltage corresponding to the charged state of the capacitor C2. Accordingly, the second voltage V2 is increased simultaneously in all the semiconductor devices 90a, 90b, and 90c. As a result, the second voltage V2 is provided to the I/O circuits 41b of the semiconductor devices 90a, 90b, and 90c at the same timing. Thus, a latch-up does not occur in any of the I/O circuits 41b.

The semiconductor device 90 of the third embodiment has the advantages described below.

The power supply circuit 91 increases the second voltage V2 supplied to the I/O circuit 41b in proportion to the increase of the first voltage V1 supplied to the internal circuit 41a. Accordingly, the voltage of signals provided to the input gate of the internal circuit 41a from the I/O circuit 41b is stabilized. Thus, the occurrence of through current is prevented. Further, the power supply circuit 91 in each of the semiconductor devices 90a, 90b, and 90c increases the first voltage V1 (V1a, V1b, and V1c) according to the soft-start signal SS, which has a voltage corresponding to the charged state of the capacitor C2. Accordingly, the second voltage V2 is increased simultaneously in all the semiconductor devices 90a, 90b, and 90c. Thus, the second voltage V2 is supplied to the I/O circuits 41b in the semiconductor devices 90a, 90b, and 90c at the same timing. As a result, the occurrence of a latch-up in the I/O circuits 41b of the semiconductor devices 90a, 90b, and 90c is prevented.

It should be apparent to those skilled in the art that the present invention may be embodied in many other specific forms without departing from the spirit or scope of the invention. Particularly, it should be understood that the invention may be embodied in the following forms.

Figure 12:
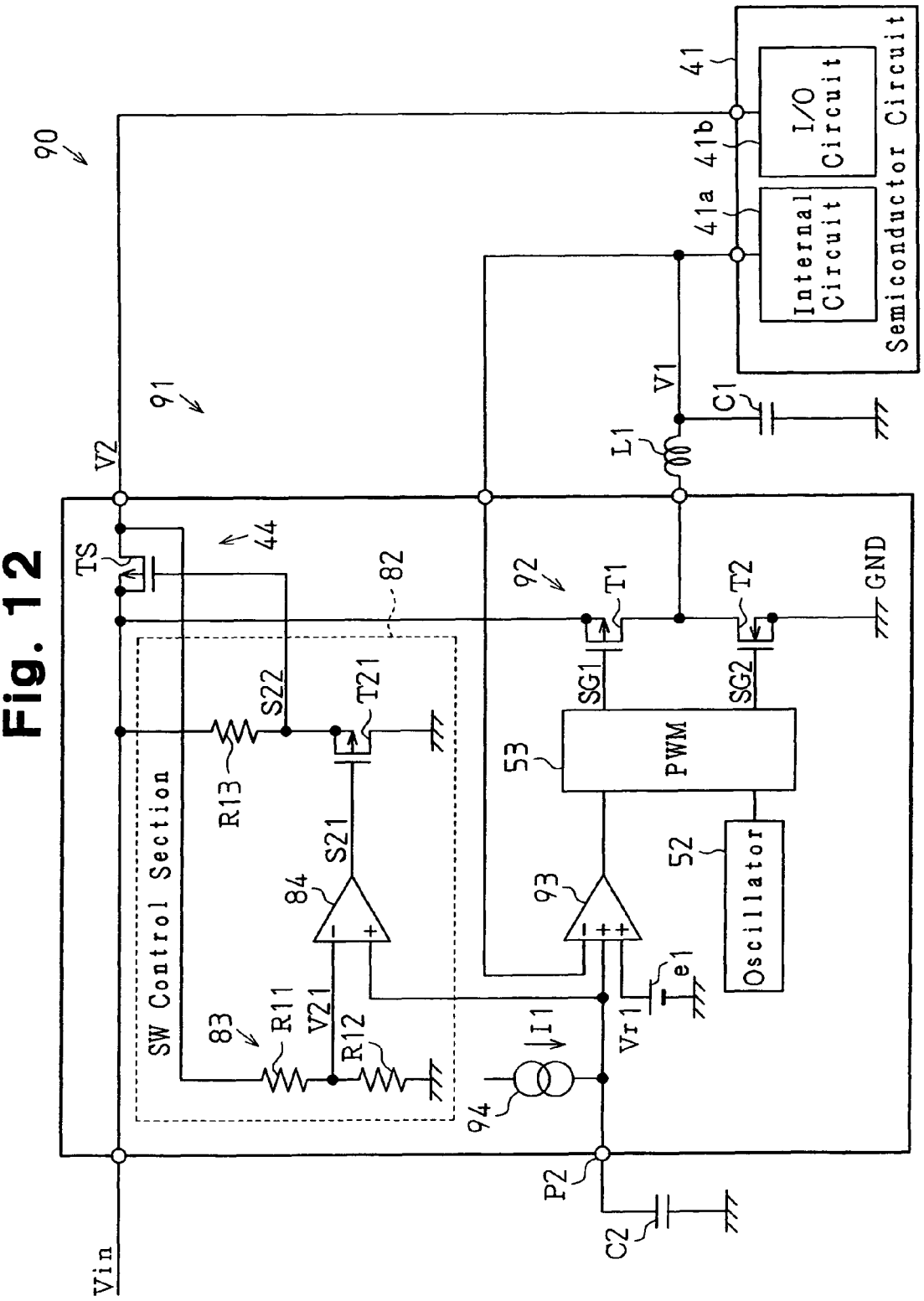
FIG. 12 is a schematic circuit diagram showing a semiconductor integrated circuit device incorporating a first modification of the DC-DC converter.

As shown in FIG. 12, in the third embodiment, the error amplifier 84 of the switch control circuit 82 may be provided with the soft-start signal SS instead of the first voltage V1.

Figure 13:
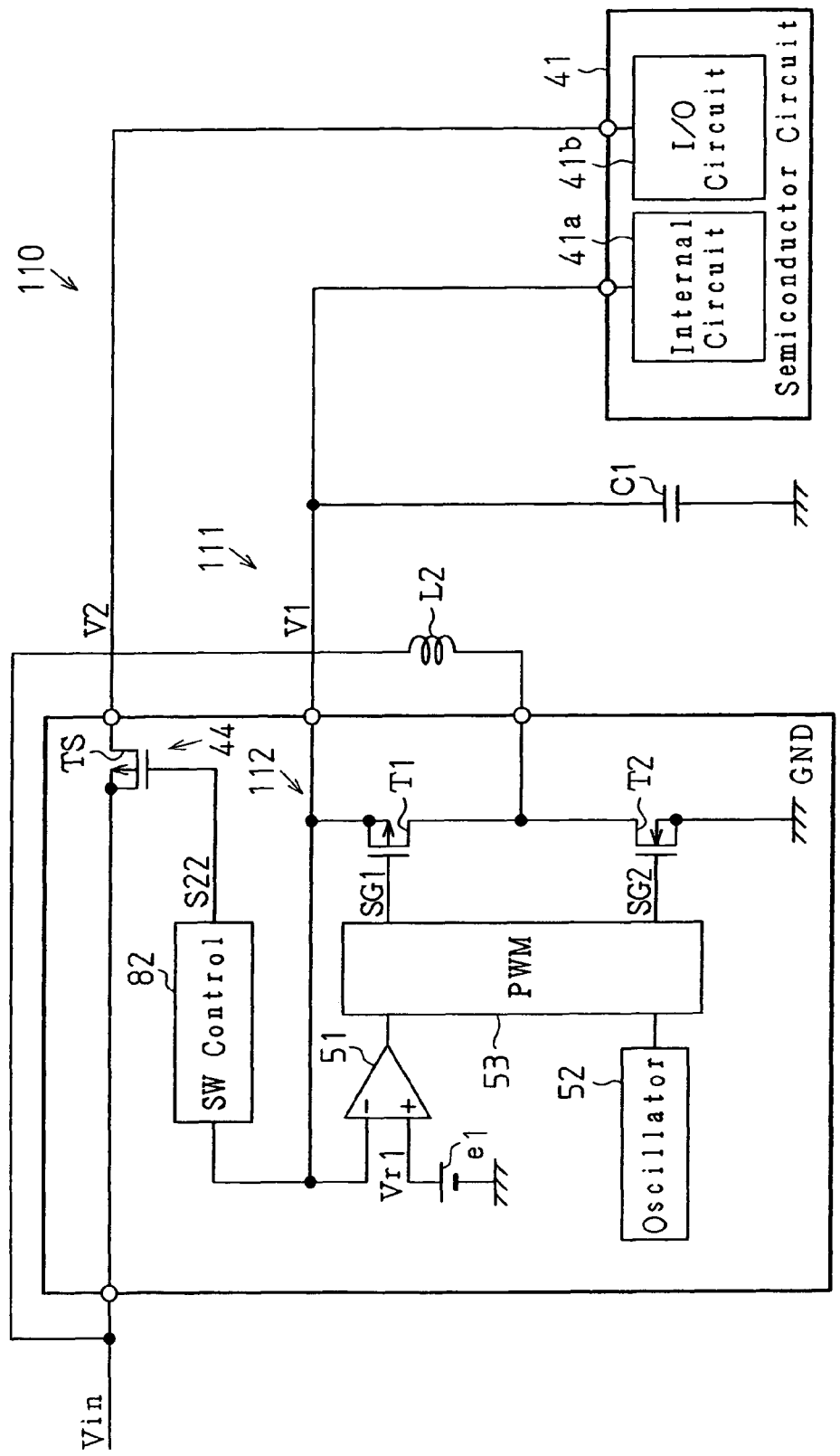
FIG. 13 is a schematic circuit diagram showing a semiconductor integrated circuit device incorporating a second modification of the DC-DC converter.

In each of the above the embodiments, the first voltage V1 and the second voltage V2 may be modified as required. For example, as shown in FIG. 13, a semiconductor integrated circuit device 110 includes a power supply circuit 111 for generating a first voltage V1 by stepping up the input voltage Vin. The power supply circuit 111 includes a converter circuit 112 having transistors T1 and T2, and a node between the transistors T1 and T2 receives the input voltage Vin via a coil L2. The stepped-up voltage (first voltage) V1 of the input voltage Vin is generated at the source of the first transistor T1.

Figure 14:
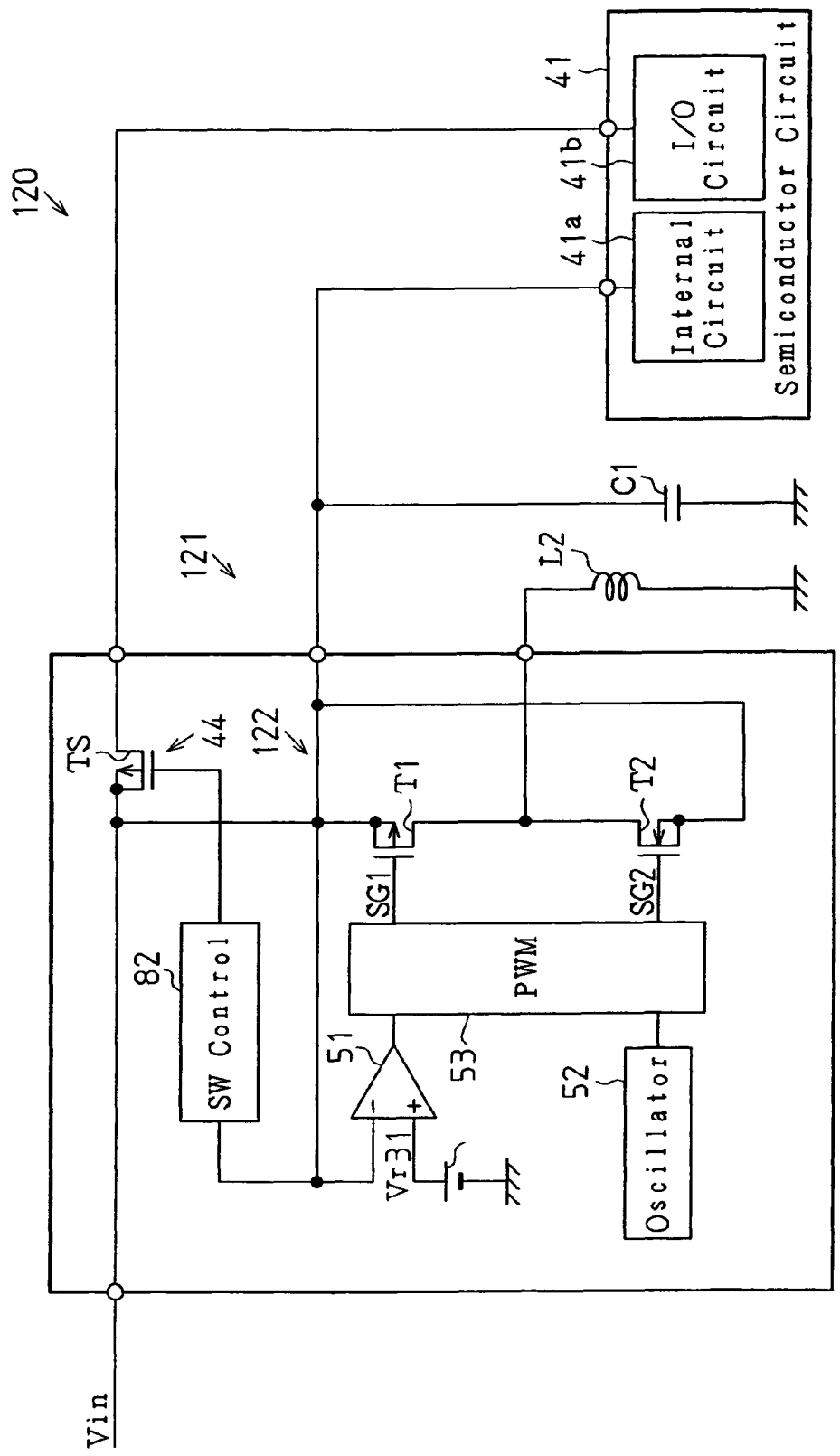
FIG. 14 is a schematic circuit diagram showing a semiconductor integrated circuit device incorporating a third modification of the DC-DC converter.

As shown in FIG. 14, a semiconductor integrated circuit device 120 includes a power supply circuit 121 for generating a negative voltage. In this case, the power supply circuit 121 has a converter circuit 122 in which the source of a second transistor T2 is connected to the semiconductor circuit 41 and a negative reference voltage Vr31 is supplied to the non-inverting input terminal of the error amplification circuit 51. In the power supply circuit 121, a negative second voltage V2 is generated at the source of the second transistor T2.

Figure 15:
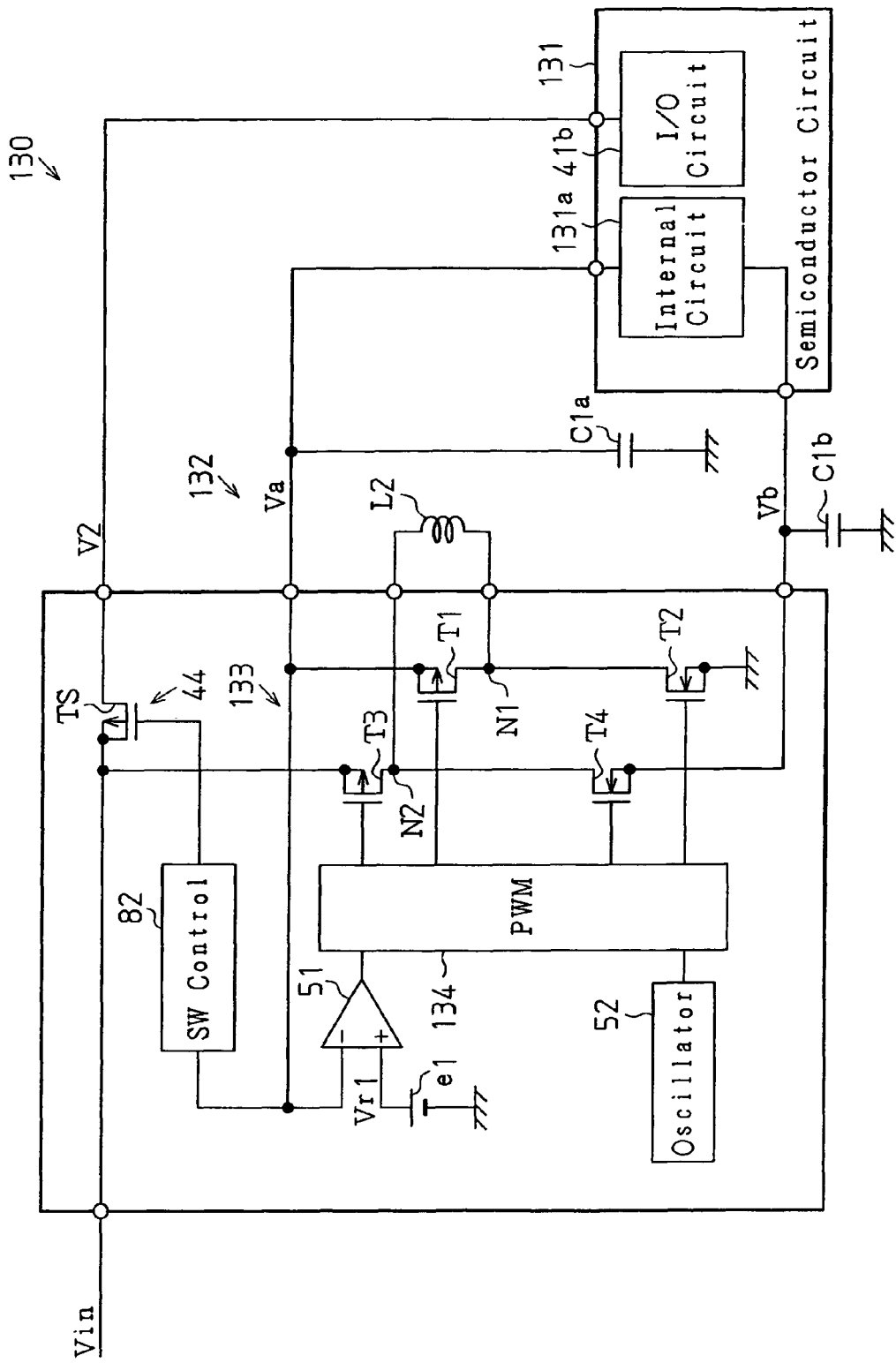
FIG. 15 is a schematic circuit diagram showing a semiconductor integrated circuit device incorporating a fourth modification of the DC-DC converter.

As shown in FIG. 15, a semiconductor integrated circuit device 130 includes a semiconductor circuit 131 and a power supply circuit 132. The semiconductor circuit 131 includes an internal circuit 131a operated by a plurality of first power supplies Va and Vb. The power supply circuit 132 generates a step-up voltage and a negative voltage. The converter circuit 133 of the power supply circuit 132 includes first and second transistors T1 and T2, which are connected in series, and third and fourth transistors T3 and T4, which are connected in series. The first transistor T1 is a p-channel MOS transistor having a source connected to the semiconductor circuit 131, a drain connected to the drain of the second transistor T2, and a gate connected to a PWM control circuit 134. The PWM control circuit 134 operates in the same manner as the PWM control circuit 53. The second transistor T2 is an n-channel MOS transistor having a source connected to the ground GND, a drain connected to the first transistor T1, and a gate connected to the PWM control circuit 134. A smoothing capacitor C1 is connected between the source of the first transistor T1 and the ground GND.

The third transistor T3 is a p-channel MOS transistor having a source for receiving the input voltage Vin, a drain connected to the fourth transistor T4, and a gate connected to the PWM control circuit 134. The fourth transistor T4 is an n-channel MOS transistor having a source connected to the semiconductor circuit 41, a drain connected to the third transistor T3, and a gate connected to the PWM control circuit 134. A smoothing capacitor C11 is connected between the source of the fourth transistor T4 and the ground GND.

A choke coil L2 is connected between a node N1 of the first and second transistors T1 and T2 and a node N2 of the third and fourth transistors T3 and T4.

The power supply circuit 132 steps up the input voltage Vin with the first and second transistors T1 and T2, and supplies the stepped-up voltage Va to the internal circuit 131a of the semiconductor circuit 131 from the source of the first transistor T1. The power supply circuit 132 further supplies, by means of the third and fourth transistors T3 and T4, a negative voltage Vb to the internal circuit 131a of the semiconductor circuit 131 from the source of the fourth transistor T4.

The connection of the above choke coil L2 prevents the area occupied by the power supply circuit 132 from being enlarged in comparison to when a step-up choke coil and a negative-voltage choke coil are separately provided.

In the embodiments above, the semiconductor circuit and the power supply circuit are formed on a single semiconductor substrate to configure a semiconductor integrated circuit device in a single chip. However, the semiconductor integrated circuit device may be formed by a plurality of chips, and these chips may be incorporated in a single package. Further, the semiconductor circuit and the power supply circuit may be formed separately by separate chips or packages, and the semiconductor integrated circuit device may be formed by mounting these chips or packages on a printed circuit board. When the power supply circuits are formed on a single semiconductor substrate, the choke coil L1 and the smoothing capacitor C1 are preferably externally connected to the circuit board. In this case, the devices formed on the semiconductor substrate (e.g., the elements enclosed by the solid line in FIG. 4) configure a control circuit for the DC-DC converter. Further, the control circuit for the DC-DC converter may be formed by the devices excluding the first and second transistors T1 and T2.

The present examples and embodiments are to be considered as illustrative and not restrictive and the invention is not to be limited to the details given herein, but may be modified within the scope and equivalence of the appended claims.

What is claimed is:

1. A power supply circuit for generating a plurality of voltages, including first and second voltages, with an input voltage, the power supply circuit comprising:
  a converter circuit for converting the input voltage into the first voltage;
  a switch circuit for outputting the input voltage as the second voltage; and
  a switch control circuit, connected to the converter circuit and the switch circuit, for comparing the first voltage with a reference voltage, generating a notification signal, based on the comparison result, for indicating the condition of the first voltage from a terminal coupled to the switch circuit, and controlling the switch circuit based on the notification signal,
  wherein the switch control circuit comprises:
  a first comparator, connected to the converter circuit, for comparing the first voltage with the reference voltage to generate a comparison signal;
  a transistor, connected to the first comparator, for generating a notification signal in response to the comparison signal; and
  a second comparator, connected to the transistor and the switch circuit, for comparing the notification signal with another reference voltage to generate a control signal for controlling the switch circuit.

2. A power supply circuit for generating a plurality of voltages, including first and second voltages, with an input voltage, the power supply circuit comprising:
  a converter circuit for converting the input voltage into the first voltage;
  a switch circuit for outputting the input voltage as the second voltage; and
  a switch control circuit, connected to the converter circuit and the switch circuit, for comparing the first voltage with a reference voltage and controlling the switch circuit based on the comparison result and a notification signal indicating the condition of the first voltage,
  wherein the switch control circuit comprises:
  a first comparator, connected to the converter circuit, for comparing the first voltage with the reference voltage to generate a comparison signal;

a transistor, connected to the first comparator, for generating a notification signal in response to the comparison signal; and a second comparator, connected to the transistor and the switch circuit, for comparing the notification signal with another reference voltage to generate a control signal for controlling the switch circuit.

* * * * *